(12) United States Patent
Wieder et al.

(10) Patent No.: US 6,675,662 B2
(45) Date of Patent: Jan. 13, 2004

(54) FLOW METER

(75) Inventors: Klaus Wieder, Helenville, WI (US); Bernd Reyer, Wuerzburg/Rottenbauer (DE)

(73) Assignee: Wieder GmbH, Schweinfurt (DE)

( * ) Notice: Subject to any disclaimer, the term of this patent is extended or adjusted under 35 U.S.C. 154(b) by 156 days.

(21) Appl. No.: 09/982,047

(22) Filed: Oct. 19, 2001

(65) Prior Publication Data

US 2002/0046613 A1 Apr. 25, 2002

(30) Foreign Application Priority Data

Oct. 19, 2000 (DE) .......................... 100 51 869

(51) Int. Cl.$^7$ ................................. G01F 1/22
(52) U.S. Cl. .................................. 73/861.57
(58) Field of Search ............... 73/861.57, 864.65, 73/864.51, 209, 861.58; 419/393

(56) References Cited

U.S. PATENT DOCUMENTS

| 828,108 | A | * | 8/1906 | Graham | ...................... 116/273 |
| 2,244,552 | A | | 6/1941 | Delaney | |
| 3,218,853 | A | | 11/1965 | Ongaro | |
| 3,408,865 | A | | 11/1968 | Chenault | |
| 3,805,611 | A | | 4/1974 | Hedland | |
| 3,889,535 | A | * | 6/1975 | Bull et al. | ................ 73/861.54 |
| 3,974,857 | A | | 8/1976 | Hehl | |
| 3,979,955 | A | | 9/1976 | Schulte et al. | |
| 4,195,518 | A | * | 4/1980 | Fees | ............................ 116/204 |
| 4,389,901 | A | | 6/1983 | Lake | |
| 4,497,202 | A | * | 2/1985 | Mermelstein | ................ 138/42 |
| 4,524,616 | A | | 6/1985 | Drexel et al. | |
| 4,945,771 | A | | 8/1990 | Ogden | |
| 5,044,199 | A | | 9/1991 | Drexel et al. | |
| 5,195,806 | A | * | 3/1993 | Schonlau et al. | .......... 303/24.1 |
| 5,240,390 | A | * | 8/1993 | Kvinge et al. | .............. 417/393 |
| 5,343,763 | A | | 9/1994 | Nielsen | |
| 5,554,805 | A | | 9/1996 | Bahrton | |
| 5,566,576 | A | * | 10/1996 | Sher et al. | ................ 73/864.62 |
| 5,698,793 | A | | 12/1997 | Carmichael | |
| 5,927,322 | A | * | 7/1999 | Rosenau | ................... 137/487.5 |
| 6,164,393 | A | * | 12/2000 | Bakke | ......................... 173/177 |

FOREIGN PATENT DOCUMENTS

| DE | 32 26 611 A1 | 2/1983 |
| DE | 36 39 349 C2 | 2/1997 |
| DE | 299 05 655 U1 | 9/1999 |
| EP | 0 266 025 | 5/1988 |

OTHER PUBLICATIONS

Patent Abstracts of Japan "Area Flowmeter and Flow Rate Measuring Method by Area Flowmeter", Application No. 63005067 filed Jan. 12, 1988.

* cited by examiner

*Primary Examiner*—Edward Lefkowitz
*Assistant Examiner*—Jewel V. Thompson
(74) *Attorney, Agent, or Firm*—Browdy and Neimark, P.L.L.C.

(57) ABSTRACT

In a flow meter, especially for liquid cooling media in injection molds, comprising a housing with an inlet and outlet conduit and inside the housing a piston that is slidable against the force of an axially acting spring by the pressure of the fluid flowing through the housing in such a way that the displacement of the piston takes place in dependence upon the flow rate and is indicated through a window, provision is made, to attain a high measuring accuracy with a simple construction, for a helical spring (22) that is guided in extension of the inlet conduit (2) in an axial direction to be disposed in such a way that the entering fluid is transported around the centrically disposed helical spring (22).

12 Claims, 2 Drawing Sheets

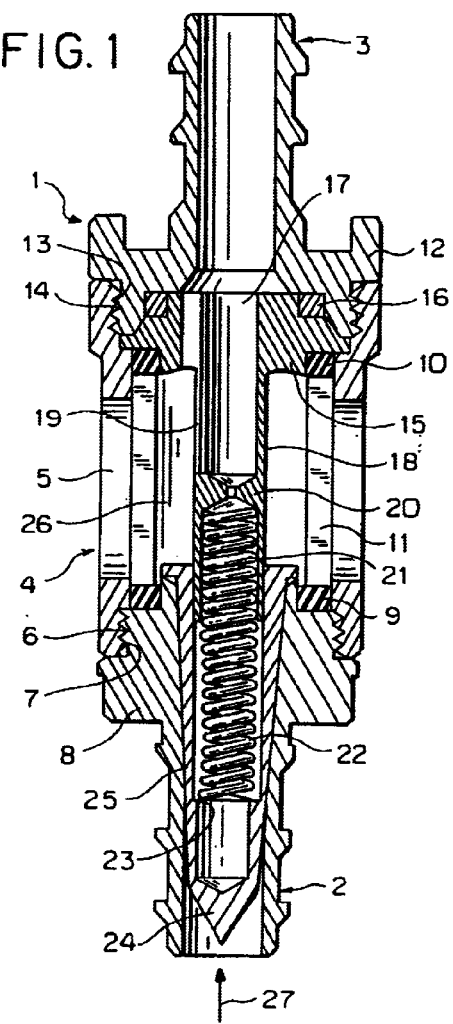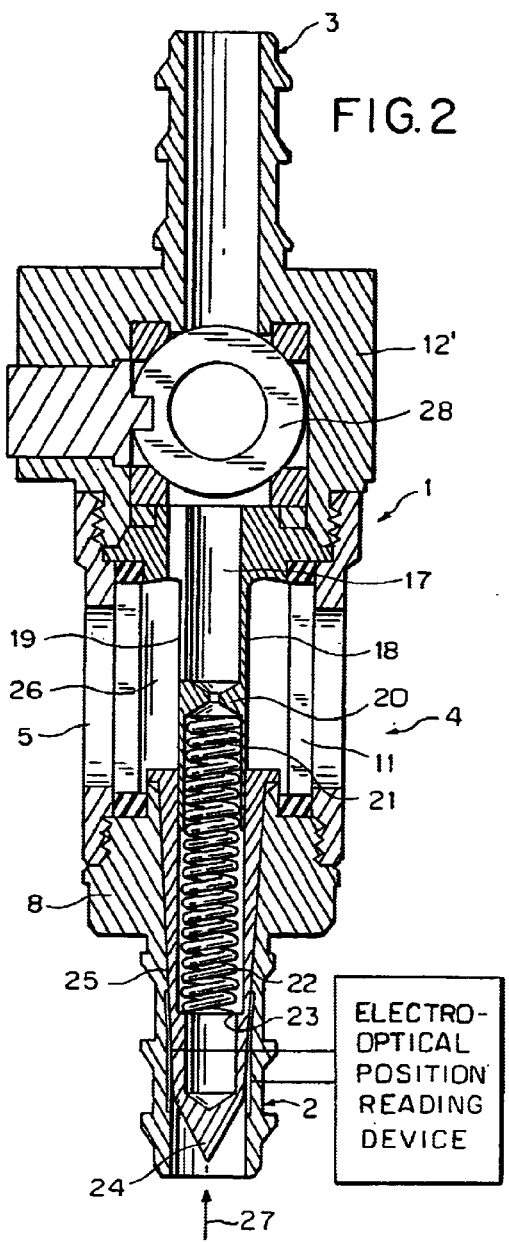

FLOW METER

BACKGROUND OF THE INVENTION

1. Field of the Invention

The present invention is directed to a flow meter, especially for liquid cooling media in injection molds, comprising a housing with an inlet and outlet conduit and inside the housing a piston that is slidable against the force of an axially acting spring by the pressure of the fluid flowing through the housing in such a way that the displacement of the piston takes place in dependence upon the flow rate and is indicated through a window.

2. Background Art

A flow meter according to the preamble is known from U.S. Pat. No. 3,979,955, wherein the flowing fluid compresses a spring, which shifts a plate, the deflection of which is readable on a scale.

U.S. Pat. No. 3,805,611 also describes a flow meter wherein a piston is displaced against the force of a spring. Disposed on the piston is a conical measuring piece, the position of which is changed proportionally to the flow rate.

From U.S. Pat. Nos. 4,389,901 and 5,343,763 flow meters are known with a hollow conical insert through which the fluid flows. The housing is transparent and provided with a scale so that the degree of shifting of a piston against the force of a spring that is caused by the flowing fluid can be seen or read.

From U.S. Pat. No. 4,945,771, a measuring device for determining the flow rate is known that comprises a compression spring mounted on a piston and an air flow controlling cone.

U.S. Pat. No. 4,497,202 describes a flow meter having radial slots to permit a laminar flow. These radial slots are formed in an annular plate.

Further flow meters are known from U.S. Pat. Nos. 828,108, 2,244,552, 3,218,853, 3,408,865, 3,889,535, 4,524,616, 5,044,199, and 5,554,805.

In known systems of this type the medium flows through the interior of the helical screw. A design of this type is expensive to construct and unsatisfactory regarding its measuring accuracy.

SUMMARY OF THE INVENTION

With this as the starting point, the invention has as its object to further develop a flow meter of the above type in such a way that it can be implemented in the most simple and cost effective manner possible while providing a high degree of measuring accuracy.

This object is met according to the invention with a helical spring that is guided in extension of the inlet conduit in an axial direction and disposed in such a way that the entering fluid is transported around the centrally disposed helical spring. This centrical position of the helical spring serves to attain particularly simple geometric conditions that permit the use of a minimum of components with an easy assembly.

A further design of the invention provides for the entering fluid to flow into an expansion chamber with an enlarged cross section after passing the piston. An expansion chamber of this type prevents turbulence from forming in the outlet area, which could cause the piston to oscillate with an alternating laminar and turbulent flow and accordingly impact the accuracy and readability of the indicator.

For a direct visibility and display of the piston position, the expansion chamber may be encompassed at least partly by a window, which may have a scale that is readable from the outside.

The outlet conduit is advantageously disposed in an axial extension of the helical spring, and a counter bearing or guide element for the helical spring may be disposed on a shoulder of the outlet conduit, said shoulder being provided with radial openings in such a way that the fluid can enter from the expansion chamber into the outlet conduit. This provides for an advantageous construction that ensures a laminar discharge of the fluid.

Provision is advantageously made for the inlet conduit to have an exterior thread in such a way that the flow meter can be screwed directly into a manifold. A manifold of this type is known from DE 40 32 562 C2. In this manner an extraordinarily compact unit is attained and it is possible to read the flow rate in multiple cooling fluid cycles more or less simultaneously.

A flow adjusting valve, which may be formed by a ball valve or plug valve, may be disposed downstream from the outlet conduit.

In the latter embodiment, provision is preferably made for the ball valve to have a valve seat and a valve lifter in such a way that the valve lifter is axially moveable via an external knurled nut or the like.

Provision is preferably made for the piston position to be measured by an electro-optical measuring device. It may be formed, for example, by a row of light-emitting diodes on one side of the piston and a corresponding row of photoelectric cells on the other side of the piston so that a certain number of photoelectric cells is illuminated or darkened, depending on the displacement of the piston, and an electronic position measuring signal can be formed accordingly.

The invention will be described in further detail below based on preferred embodiments in conjunction with the drawings.

BRIEF DESCRIPTION OF THE DRAWINGS

FIG. 1 shows a longitudinal section through a first embodiment,

FIG. 2 through a further embodiment with a ball valve, and

DESCRIPTION OF THE PREFERRED EMBODIMENTS

Figure 3:
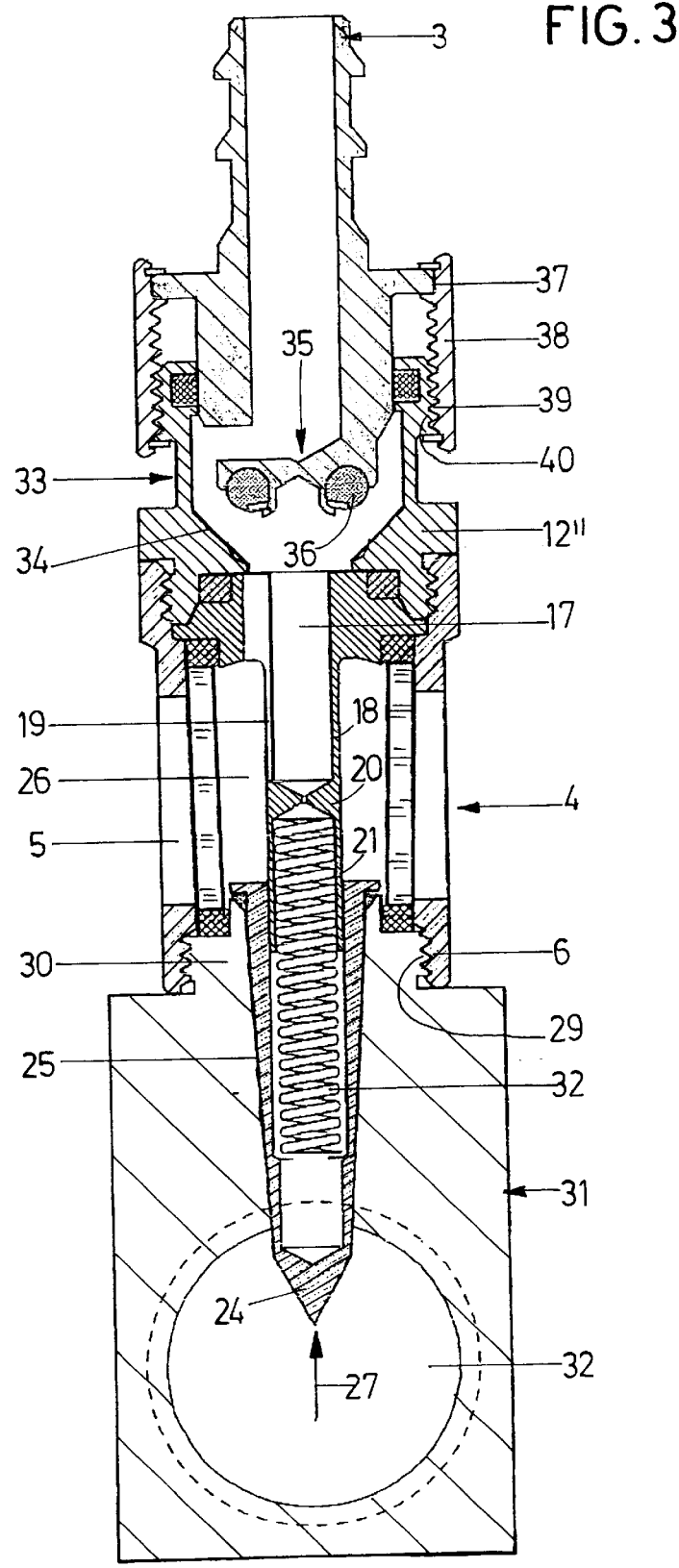
FIG. 3 an embodiment that is screwed onto a manifold.

An inventive flow meter that is shown in the drawing comprises a housing 1 with an inlet conduit 2 and an outlet conduit 3, which are each designed as a tube connection.

A central housing section 4 with a window 5 is screwed by means of an inside thread 6 onto an exterior thread 7 of a base-like widening 8 of the inlet conduit 2, with the window 5 designed as an opening, thus providing free view onto a sleeve element 11 of transparent plastic that is held in place by seals 9, 10.

The outlet conduit 3 also has a base-like shoulder 12 with an external thread 13 onto which an inside thread 14 of the housing center part 4 is screwed. This also creates a counter bearing or guide element 15 via a sealing ring 16 against the sleeve element 11.

The counter bearing or guide element 15 has, in extension of the outlet conduit 3, a through-opening 17, in the extension of which axial webs 18 are formed, between which through-slots 19 are provided. The webs 18 carry a counter bearing 20, and the extensions 21 of the webs 18 form a guide section for a helical spring 22 that actuates, via an annular shoulder 23, a piston 24 that is axially displaceable in the inlet line 2 and conically widens towards the top and sits in a corresponding conical recess 25 of the base 8. The recess 25 connects to the expansion chamber 26, which is bounded by the sleeve element 11.

If fluid enters through the inlet conduit 2 in the direction of the arrow 27, the piston 24 is displaced upward in the drawing against the force of the helical spring 22 and accordingly unblocks a passage region relative to the recess 25 so that the fluid enters into the expansion chamber 26 and can expand there. Through the slots 19 the fluid then enters into the through-opening 17 and into the outlet conduit 3.

The degree of deflection of the piston 24 is proportional to the flow rate, with the deflection of the piston being readable on the sleeve element 11 via the window 5 based on a scale not shown in the drawing.

The embodiment shown in FIG. 2 corresponds, in its basic construction, to the embodiment according to FIG. 1, except that the part 12' has a ball-type through-valve 28 through which the fluid must pass before it enters into the outlet conduit 3.

In the embodiment shown in FIG. 3, the inside thread 6 of the center housing part 4 is screwed onto the exterior thread 29 on a neck-like projection 30 of a manifold 31, which has a manifold conduit 32 extending perpendicular to the drawing plane in FIG. 3.

Furthermore, a plug valve 33 is connected to the center housing part 4 in the embodiment according to FIG. 3, the valve seat 34 of which is formed in the part 12". The valve plug 35 with a sealing ring 36 sits in a groove 37 of a knurled nut 38, which, with its inside thread 39, acts together with an external thread 40 on the part 12" so that the valve cone 35 may be moved up or down by actuating the knurled nut 38 and the flow rate becomes adjustable in this manner.

What is claimed is:

1. A flow meter, especially for liquid cooling media in injection molds, comprising,
   a housing with an inlet and outlet conduit, a piston slidable inside the housing against a force of an axially acting spring caused by pressure from a fluid flowing through the housing, a displacement of the piston being dependent upon a flow rate of the fluid and indicated through a window;
   wherein a helical spring is arranged in an extension of the inlet conduit in an axial direction so that entering fluid is transported around the centrically disposed helical spring,
   wherein the piston (24) is formed conically and disposed in a conical recess (25), wherein the fluid, after passing an interspace between the recess (25) and the piston (24), flows into an expansion chamber which has a cross-section greater than that of the recess (25).

2. A flow meter according to claim 1, wherein the expansion chamber (26) is encompassed at least partly by a window (5).

3. A flow meter according to claim 1, wherein the outlet conduit (3) is disposed in an axial extension of the helical spring (22).

4. A flow meter according to claim 3, wherein a counter bearing or guide element (15) for the helical spring (22) is disposed on a shoulder of the outlet conduit (3), said shoulder being provided with radial openings (19) so that the fluid can enter from the expansion chamber (26) into the outlet conduit (3).

5. A flow meter according to claim 1, wherein a center housing part (4) is threaded so that the flow meter can be screwed directly onto a manifold (31).

6. A flow meter according to claim 1, wherein the outlet conduit (3) has a flow adjustment valve (28, 33) disposed downstream from it.

7. A flow meter according to claim 6, wherein the adjustment valve is a ball valve (28).

8. A flow meter according to claim 7, wherein the adjustment valve is a plug valve.

9. A flow meter according to claim 8, wherein the plug valve (33) has a valve seat (34) and a valve lifter (35) SO that the valve lifter (35) is axially movable relative to the valve seat (34) by an external knurled nut (38).

10. A flow meter according to claim 1, wherein the piston has an assigned electro-optical position reading device.

11. A flow meter according to claim 10, wherein the electro-optical position reading device is formed by a luminous source or luminous source field and a photoelectric cell or photoelectric cell field.

12. A flow meter according to claim 1, wherein the helical spring (22) is arranged in an extension (21), which is slidably engaged in the conical piston (24).

* * * * *